United States Patent
Chang

(10) Patent No.: US 6,733,094 B1
(45) Date of Patent: May 11, 2004

(54) LIFTING DEVICE FOR LCD

(76) Inventor: Chun-Chung Chang, 24, Lane 215, Chang Shun Street, Changhua (TW)

( * ) Notice: Subject to any disclaimer, the term of this patent is extended or adjusted under 35 U.S.C. 154(b) by 0 days.

(21) Appl. No.: 10/292,704

(22) Filed: Nov. 13, 2002

(51) Int. Cl.$^7$ ............................ A47B 88/00; A47B 5/00
(52) U.S. Cl. .................... 312/7.2; 312/306; 312/312; 312/319.5; 312/319.7
(58) Field of Search ................. 312/7.2, 319.5, 312/319.7, 223.3, 306, 312, 196

(56) References Cited

U.S. PATENT DOCUMENTS

| | | | | |
|---|---|---|---|---|
| 911,843 A | * | 2/1909 | Sample | 62/379 |
| 3,761,152 A | * | 9/1973 | Cory | 312/7.2 |
| 4,065,194 A | * | 12/1977 | Mattia | 312/247 |
| 5,797,666 A | * | 8/1998 | Park | 312/319.5 |
| 2002/0101139 A1 | * | 8/2002 | Lee | 312/196 |

FOREIGN PATENT DOCUMENTS

DE  3132171 A1 * 3/1983 ........... A47B/81/06

* cited by examiner

*Primary Examiner*—Peter M. Cuomo
*Assistant Examiner*—Sarah C. Burnham
(74) *Attorney, Agent, or Firm*—Rabin & Berdo, P.C.

(57) ABSTRACT

A parallelepiped lifting device mounted under a computer desk in a storage position is disclosed. Prior to using a computer, the device is activated by starting a motor in a clockwise rotation to lift an LCD of the computer from under the desk by means of a mechanism comprising chain wheels, bars, and adjusting screws. A lowering of the device into the desk is performed by starting the motor in a counterclockwise rotation by means of the same mechanism. The invention can save desk space for other purposes in the storage position.

4 Claims, 6 Drawing Sheets

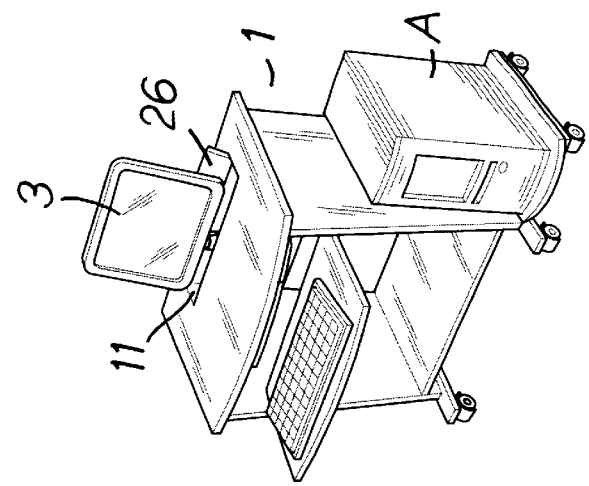
FIG.6-C
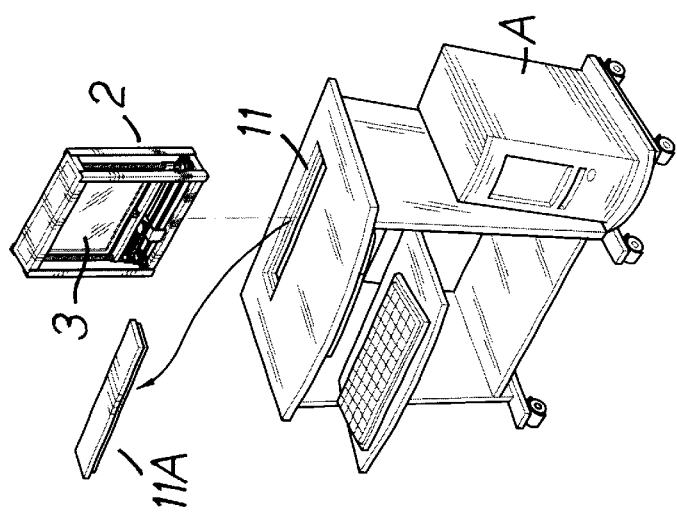
FIG.1-B
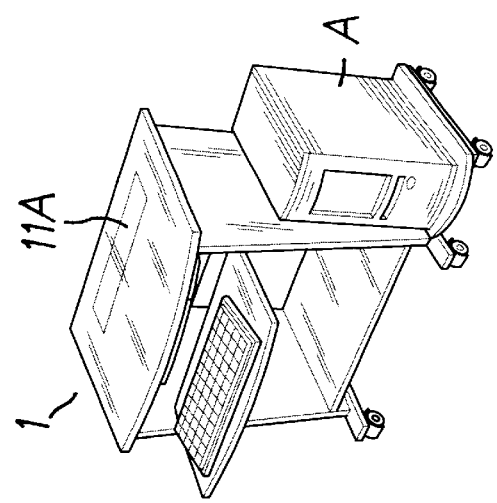
FIG.1-A

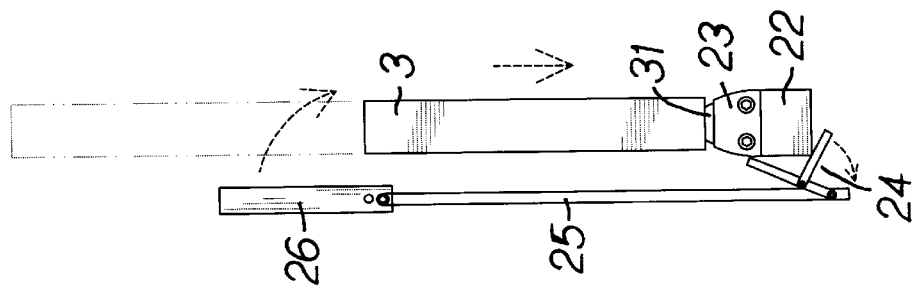
FIG. 7
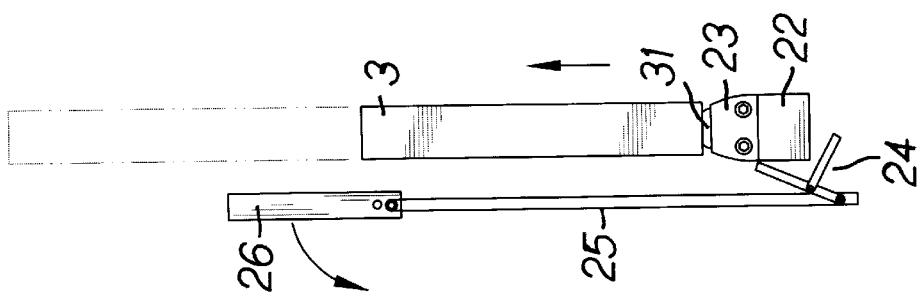
FIG. 6-A
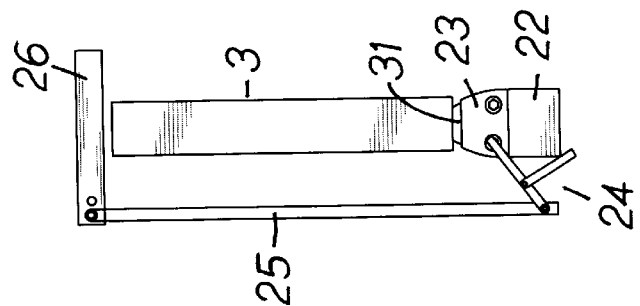
FIG. 5-A

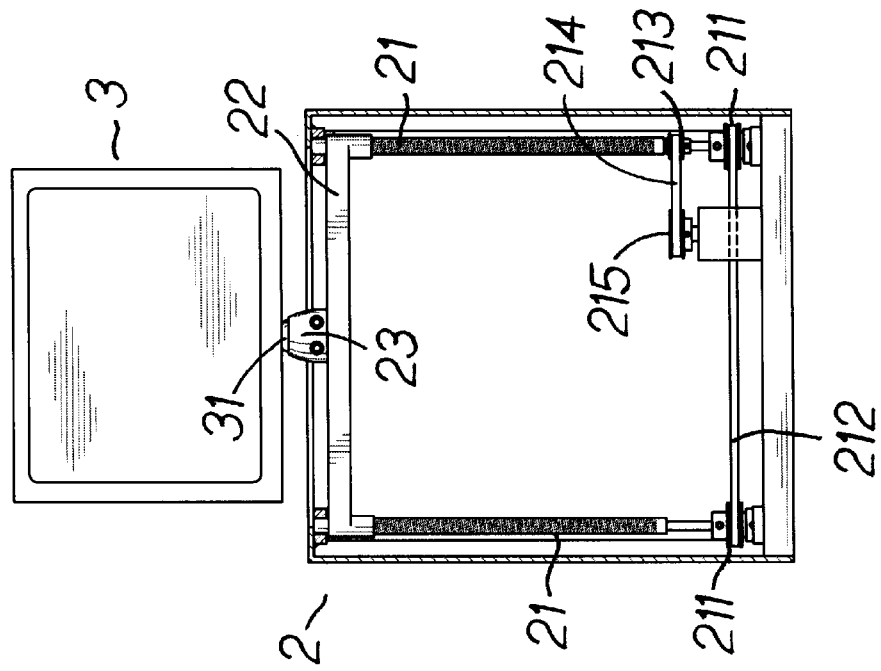
FIG. 5-B
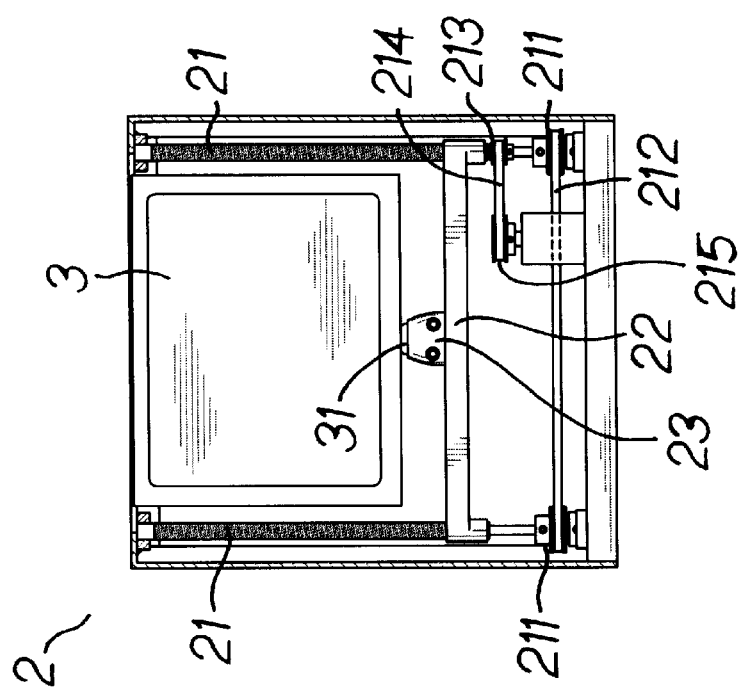
FIG. 6-B

LIFTING DEVICE FOR LCD

FIELD OF THE INVENTION

The present invention relates to arrangement of LCD (liquid crystal display) and more particularly to an improved device which can lift the LCD from under, for example, a computer desk for use or lower the same to be covered under the desk in a storage position for saving desk space for other purposes.

BACKGROUND OF THE INVENTION

It is understood that space left on a computer desk is limited since computer, monitor, keyboard, and one or more peripherals have already occupied a substantial portion of the desk. This is particularly true for a CRT (cathode ray tube) monitor. For decreasing size of the bulky CRT monitor, LCDs have been developed. The LCD is advantageous over the CRT monitor in many fields such as lightweight, compact, less power consumption, etc. It is envisaged that the CRT monitors will be phased out gradually as more people like the LCDs.

However, both the prior art suffered from a disadvantage. In detailed, the CRT monitor or the LCD is still placed on the desk when the computer is not in use. Hence, precious desk space is still wasted. Thus improvement exists.

SUMMARY OF THE INVENTION

It is therefore an object of the present invention to provide a parallelepiped lifting device mounted under a computer desk in a storage position, comprising an electric motor capable of rotating clockwise or counterclockwise; two side adjusting screws; a transverse bar interconnecting the adjusting screws, the transverse bar being moveable along the adjusting screws as they advance; a ball-and-socket joint at about the center of the transverse bar; an LCD coupled to the ball-and-socket joint, the LCD being covered in the storage position; a post behind the LCD; an upper dust cover pivotably coupled to the top of the post; a lower L-shaped foot pivotably coupled to the bottom of the post; a pair of first rollers at the bottoms of the adjusting screws; a first belt fitted around the first rollers; an idler roller on the adjusting screw; a drive roller fixed at the bottom of the lifting device; and a second belt fitted around the idler and drive rollers, wherein both the idler and drive rollers are disposed between the transverse bar and the first rollers, in a lifting operation of the LCD, the motor is started in the clockwise rotation for activating the drive roller in order to advance the second belt, the idler roller is then driven by the conveying second belt, the L-shaped foot is pivoted to lower the post, in response, the dust cover is pivoted upward about the post for exposing the LCD, one of the adjusting screws is driven by the idler roller to advance, the advance is in synchronism with that of the other adjusting screw, the advances are converted into an upward movement of the transverse bar for lifting the LCD from the lifting device until a predetermined maximum lifting distance is reached, and in a lowering operation of the LCD, the motor is started in the counterclockwise rotation for activating the drive roller in order to advance the second belt, the idler roller is then driven by the conveying second belt, the L-shaped foot is pivoted to raise the post, in response, the dust cover is pivoted downward about the post for closing the LCD, one of the adjusting screws is driven by the idler roller to advance, the advance is in synchronism with that of the other adjusting screw, the advances are converted into a downward movement of the transverse bar for lowering the LCD into the lifting device until a predetermined maximum lowering distance is reached.

The above and other objects, features and advantages of the present invention will become apparent from the following detailed description taken with the accompanying drawings.

BRIEF DESCRIPTION OF THE DRAWINGS

FIG. 1A is a perspective view of a computer desk where both an LCD and a lifting device therefor according to a preferred embodiment of the invention are covered by an access cover;

FIG. 1B is an exploded perspective view of the computer desk and the lifting device where the access cover is removed;

FIG. 5A is a side view where the LCD is covered by the access cover under the desk;

FIG. 5B is a front view of FIG. 5A;

FIG. 6A is a side view where the LCD is about to rise as the access cover is pivoted to an upright position;

FIG. 6B is a front view of the lifting device where the LCD has been fully lifted;

FIG. 6C is a perspective view showing the fully lifted LCD on the desk;

FIG. 7 is a side view where the LCD is about to lower to be covered by the access cover.

DETAILED DESCRIPTION OF THE PREFERRED EMBODIMENTS

Figure 2:
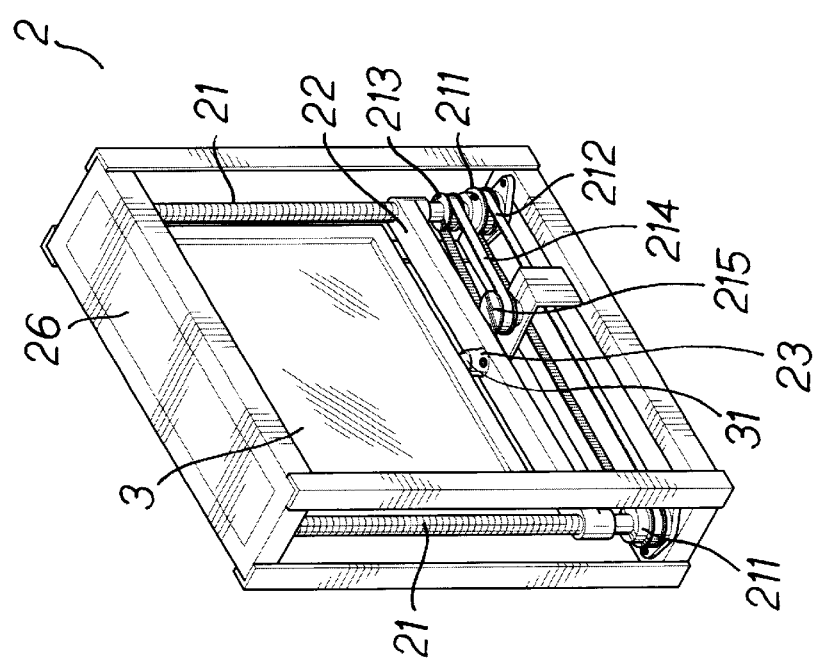
FIG. 2 is a perspective view of the lifting device.

Referring to FIGS. 1 to 7, there is shown a lifting device 2 in accordance with the invention. The lifting device 2 is associated with a computer A and is installed under a computer desk 1. In a storage position, the lifting device 2 is covered by an access cover 11A which is releasably positioned on a rectangular opening 11 on the desk 1. The lifting device 2 is a parallelepiped frame and comprises two side adjusting screws 21, a transverse bar 22 interconnecting the adjusting screws 21, the transverse bar 22 being moveable along the adjusting screws 21 as they advance, a ball-and-socket joint 23 at about the center of the transverse bar 22, an LCD 3 of the computer A coupled to the ball-and-socket joint 23, a post 25 behind the LCD 3, an upper dust cover 26 pivotably coupled to the top of the post 25, a lower L-shaped foot 24 pivotably coupled to the bottom of the post 25, a pair of first rollers 211 at the bottoms of the adjusting screws 21, a first belt 212 fitted around the first rollers 211, an idler roller 213 on the adjusting screw 21, a drive roller 215 on a bracket fixed at the bottom of the lifting device 2, both the rollers 213 and 215 being disposed between the transverse bar 22 and the bottom of the lifting device 2, and a second belt 214 fitted around the idler and drive rollers 213 and 215.

Operations of the invention will now be described in detail below. For using the computer A, a user first has to remove the access cover 11A from the desk 1. Next, starts an electric motor (not shown) in a clockwise rotation for activating the drive roller 215 in order to advance the second belt 214. And in turn, the idler roller 213 is driven by the conveying second belt 214. Further, one adjusting screw 21 is driven by the idler roller 213 to advance. Such advance is in synchronism with that of the other adjusting screw 21. In combination, the advances are then converted into an upward movement of the transverse bar 22. At the same time, the L-shaped foot 24 is pivoted to lower the post 25. In response, the dust cover 26 is pivoted upward about the post 25 for exposing the LCD 3. Hence, the LCD 3 is slowly lifting from the lifting device 2 as the dust cover 26 is fully opened. The lifting will stop if the LCD 3 has fully projected above the surface of the desk 1 with the transverse bar 22 stopped by a limit switch (not shown).

When the user does not want to use the computer A for a relatively long period of time for saving desk space for other purposes, the user may first start the motor in a counter-clockwise rotation for activating the drive roller 215 in order to advance the second belt 214. And in turn, the idler roller 213 is driven by the conveying second belt 214. Further, one adjusting screw 21 is driven by the idler roller 213 to advance. Such advance is in synchronism with that of the other adjusting screw 21. In combination, the advances are then converted into a downward movement of the transverse bar 22. At the same time, the L-shaped foot 24 is pivoted to raise the post 25. In response, the dust cover 26 is pivoted downward about the post 25 for closing the LCD 3. Hence, the LCD 3 is slowly lowering into the lifting device 2 as the dust cover 26 is fully closed. The lowering will stop if the LCD 3 has been fully covered under the surface of the desk 1 with the transverse bar 22 stopped by the limit switch.

Figure 4:
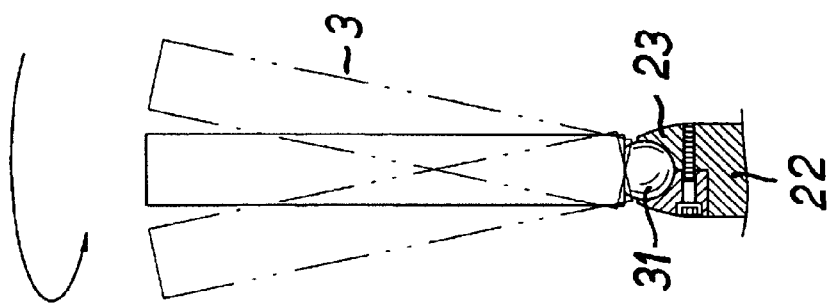
FIG. 4 is a side view in part section showing different tilt angles of the LCD about the transverse bar.
Figure 3:
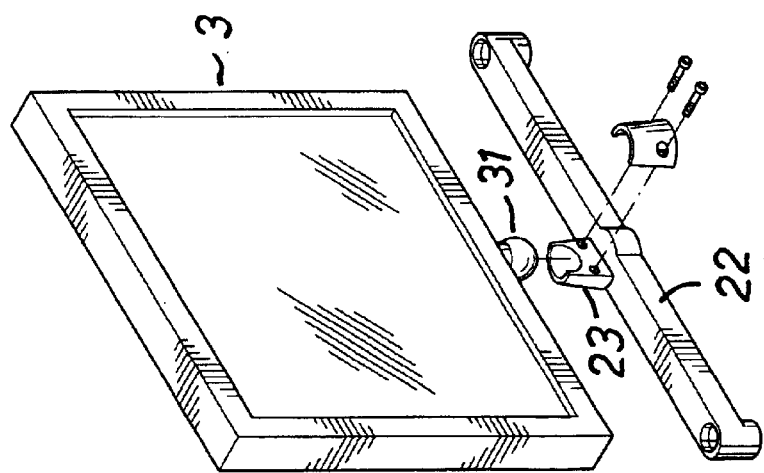
FIG. 3 is an exploded perspective view of the LCD, ball-and-socket joint, and transverse bar.
Figure 8:
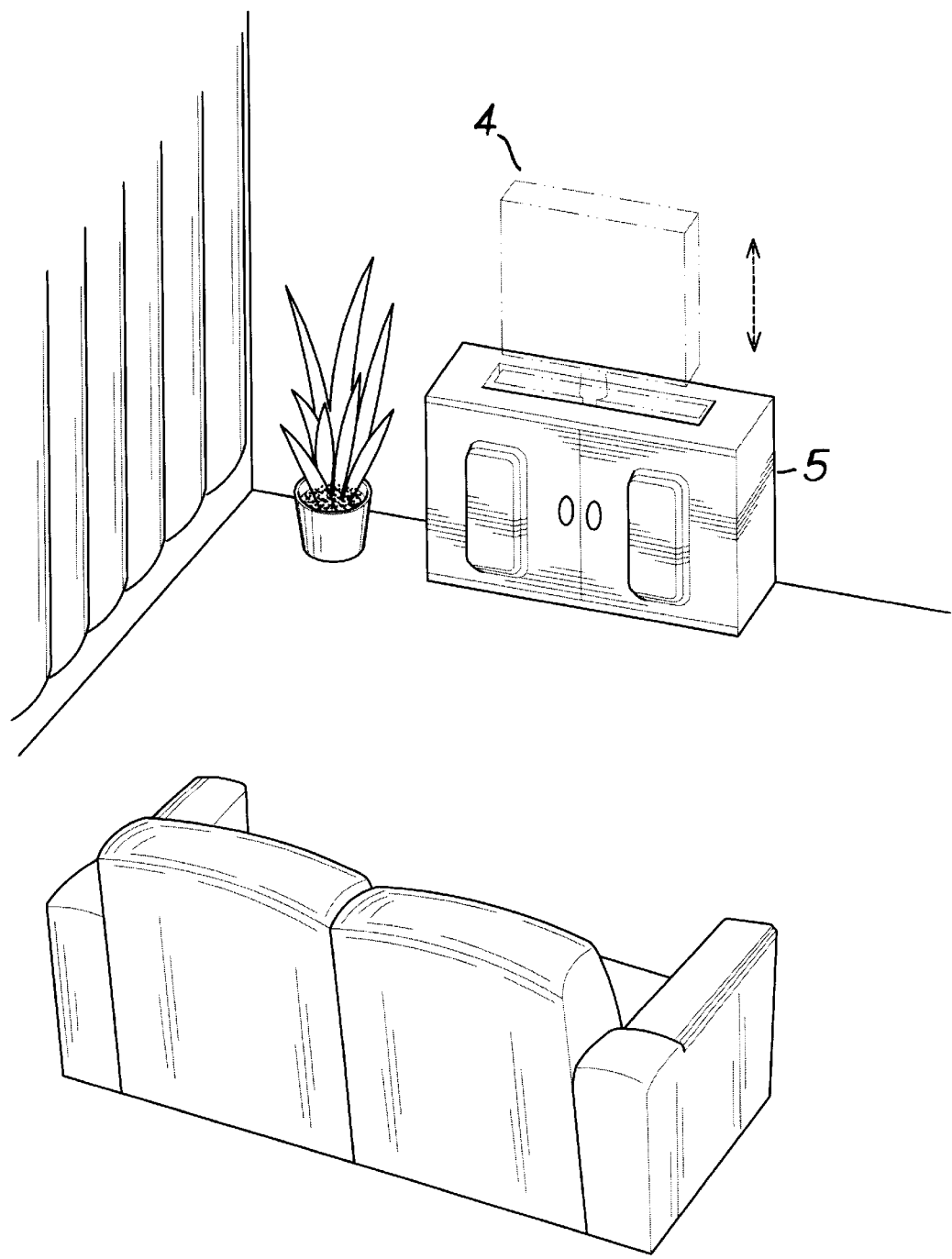
FIG. 8 is an environmental view of the invention which is associated with a liquid crystal TV screen shown in phantom lines in a living room.

For obtaining a better viewing angle, the user can tilt the LCD 3 about the ball-and-socket joint 23 a limited angle (see FIG. 4). Referring to FIG. 8, in another preferred embodiment the lifting device is associated with a liquid crystal TV screen 4 in a living room. The operations of the lifting device in this embodiment are the same as above. Thus a detailed description thereof is omitted herein for the sake of brevity.

While the invention has been described by means of specific embodiments, numerous modifications and variations could be made thereto by those skilled in the art without departing from the scope and spirit of the invention set forth in the claims.

What is claimed is:

1. A parallelepiped lifting device mounted under an element in a storage position, comprising:

an electric motor capable of rotating clockwise or counterclockwise; two side adjusting screws;

a transverse bar interconnecting the adjusting screws, the transverse bar being moveable along the adjusting screws as they advance;

a ball-and-socket joint at about the center of the transverse bar;

an LCD coupled to the ball-and-socket joint, the LCD being covered in the storage position;

a post behind the LCD;

an upper dust cover pivotably coupled to the top of the post;

a lower L-shaped foot pivotably coupled to the bottom of the post;

a pair of first rollers at the bottoms of the adjusting screws;

a first belt fitted around the first rollers;

an idler roller on the adjusting screw;

a drive roller fixed at the bottom of the lifting device; and a second belt fitted around the idler and drive rollers, wherein both the idler and drive rollers are disposed between the transverse bar and the first rollers, in a lifting operation of the LCD, the motor is started in the clockwise rotation for activating the drive roller in order to advance the second belt, the idler roller is then driven by the conveying second belt, the L-shaped foot is pivoted to lower the post, in response, the dust cover is pivoted upward about the post for exposing the LCD, one of the adjusting screws is driven by the idler roller to advance, the advance is in synchronism with that of the other adjusting screw, the advances are converted into an upward movement of the transverse bar for lifting the LCD from the lifting device until a predetermined maximum lifting distance is reached, and in a lowering operation of the LCD, the motor is started in the counterclockwise rotation for activating the drive roller in order to advance the second belt, the idler roller is then driven by the conveying second belt, the L-shaped foot is pivoted to raise the post, in response, the dust cover is pivoted downward about the post for closing the LCD, one of the adjusting screws is driven by the idler roller to advance, the advance is in synchronism with that of the other adjusting screw, the advances are converted into a downward movement of the transverse bar for lowering the LCD into the lifting device until a predetermined maximum lowering distance is reached.

2. The lifting device of claim 1, wherein the element is a computer desk, the computer desk having an access cover which is removed prior to the lifting operation of the LCD.

3. The lifting device of claim 1, wherein the LCD is an LCD of a computer.

4. The lifting device of claim 1, wherein the LCD is an LCD of a television.

* * * * *